United States Patent [19]

Krasnow

[11] 3,989,543

[45] Nov. 2, 1976

[54] ELECTROCHEMICAL CELL HAVING LEAD FLUORIDE CATHODE

[75] Inventor: Philip Krasnow, Brooklyn, N.Y.

[73] Assignee: Mitchell Kurzban, Melville, N.Y. ; a part interest

[22] Filed: Feb. 2, 1972

[21] Appl. No.: 223,043

Related U.S. Application Data

[63] Continuation of Ser. No. 37,453, May 18, 1970, abandoned, which is a continuation of Ser. No. 743,475, July 9, 1968, abandoned.

[52] U.S. Cl. .............................. 429/118; 429/194
[51] Int. Cl.$^2$ ......................................... H01M 35/02
[58] Field of Search ............. 136/100, 83, 6, 26–27, 136/136–137, 154, 155, 134–135, 120–122

[56] References Cited
UNITED STATES PATENTS

| | | | |
|---|---|---|---|
| 2,078,143 | 4/1937 | Jumau .................................. | 136/100 |
| 3,320,093 | 5/1967 | Harding et al. ...................... | 136/122 |
| 3,352,718 | 11/1967 | Carson, Jr. et al. ............. | 136/137 X |
| 3,393,097 | 7/1968 | Robinson et al. ...................... | 136/83 |

*Primary Examiner*—Anthony Skapars
*Attorney, Agent, or Firm*—Hubbell, Cohen, Stiefel & Gross

[57] ABSTRACT

An electrochemical cell comprising a lead (II) fluoride cathode, a conductive electrolyte solution such as sea water or a salt-containing organic solvent and an anode of a substance more electropositive than lead fluoride such as magnesium. The cathode preferably comprises lead fluoride, optionally containing an organic binder, a fibrous reinforcement, or a "dope," and an electrically conductive, ionically permeable collector in contact therewith. The cathode may be formed by pressing lead fluoride into a desired shape and then applying metallic collector material onto the cathode surface. Alternatively, molten depolarizing material may be absorbed into a porous graphite collector element and then cooled to form a carbon-reinforced cathode.

11 Claims, 9 Drawing Figures

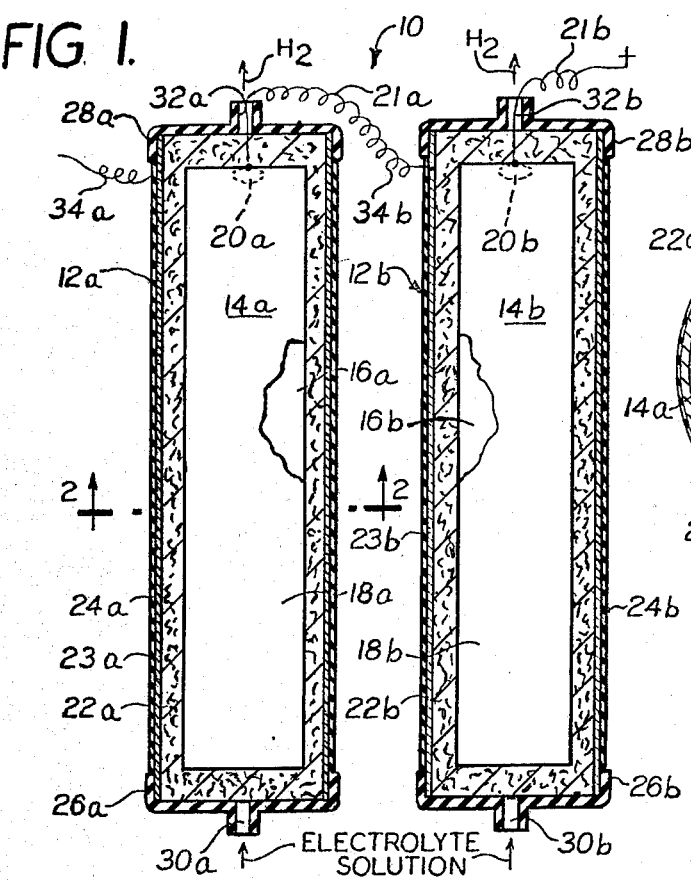
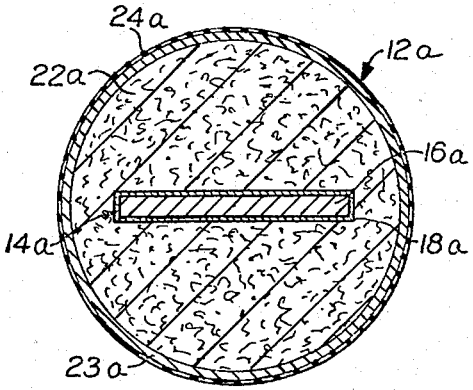
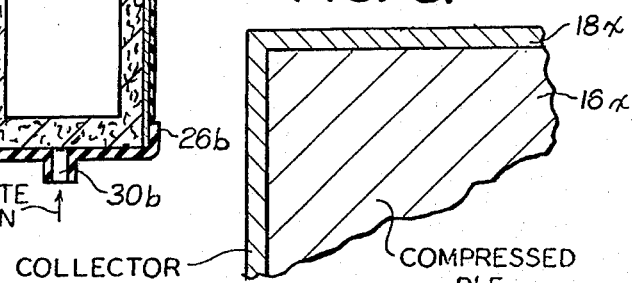
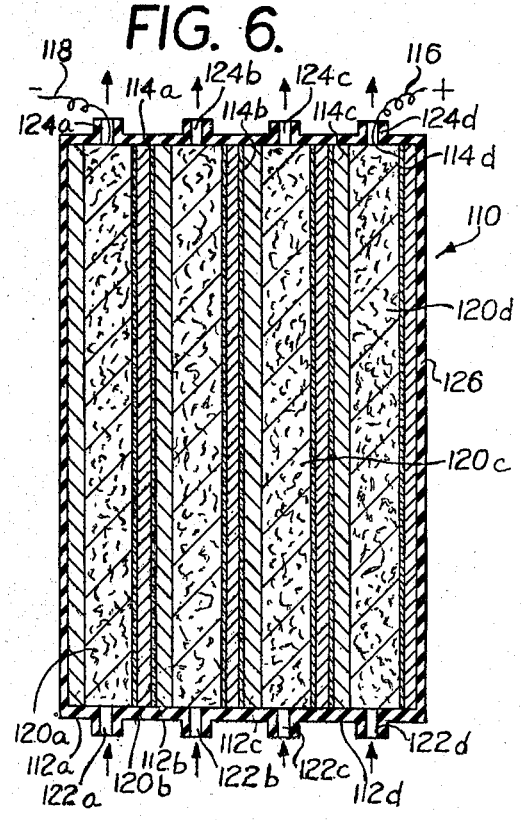
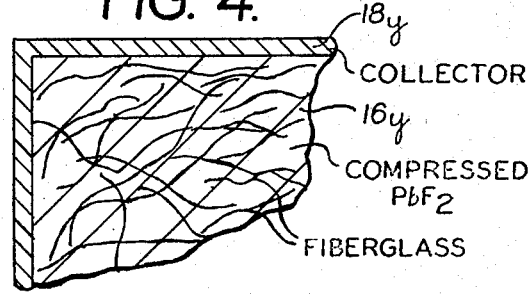
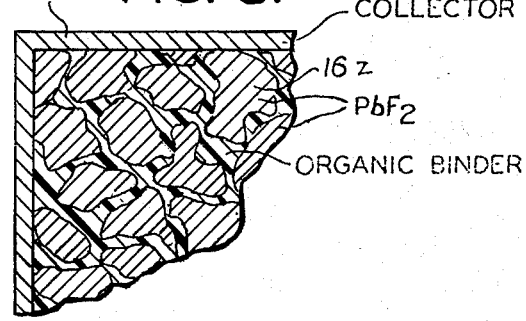

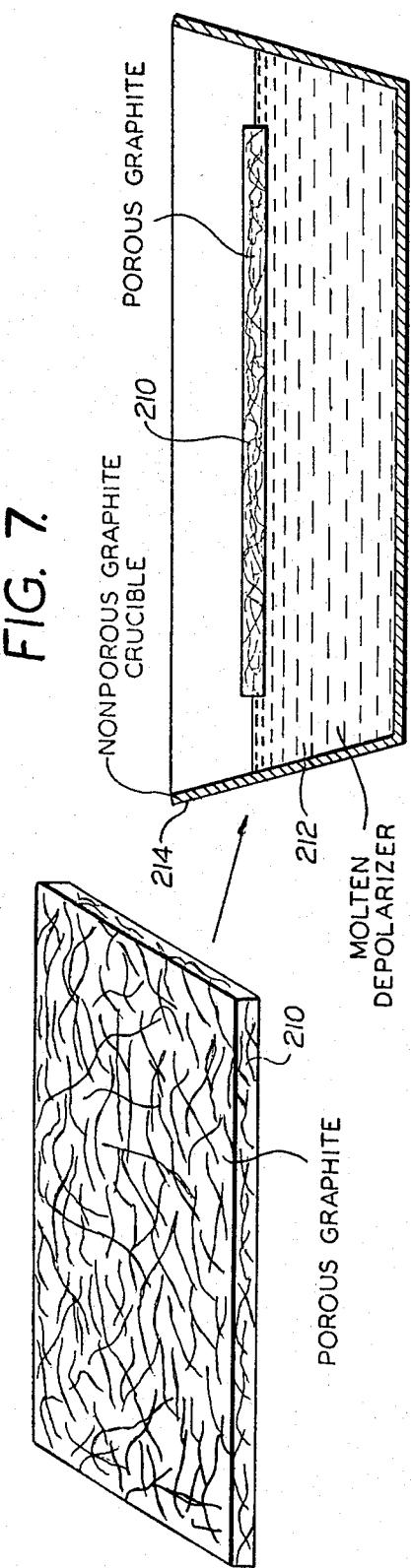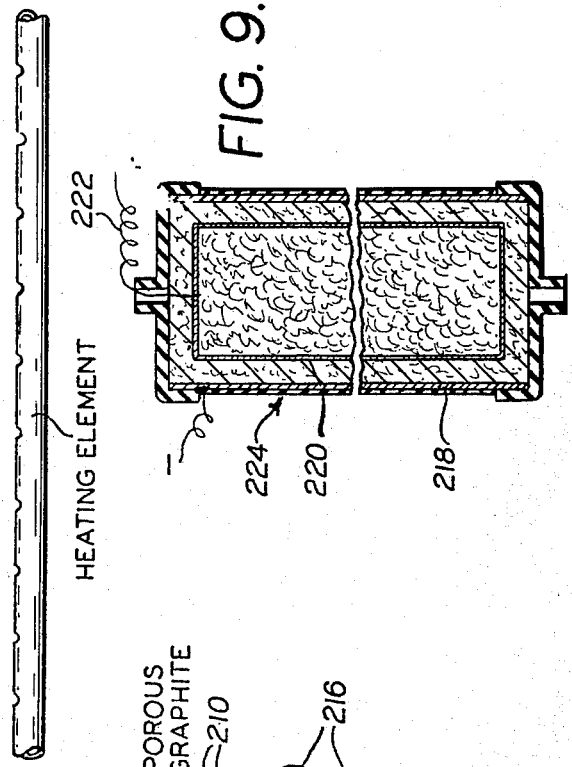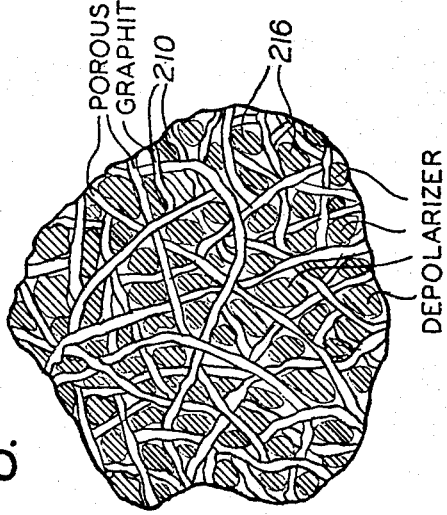

1

ELECTROCHEMICAL CELL HAVING LEAD FLUORIDE CATHODE

This is a continuation of application Ser. No. 37,453 filed May 18, 1970 which is in turn a continuation of application Ser. No. 743,475, filed July 9, 1968, both now abandoned.

BACKGROUND OF THE INVENTION

1. Field of the Invention

The present invention relates to an electrochemical cell having a cathode of lead (II) fluoride and to methods for making a cathode having such depolarizing material.

2. Description of the Prior Art

Electrochemical cells having a pair of electrically conductive electrodes of dissimilar materials immersed in a conductive solution, generally sea water, are commercially available. The most common employ a magnesium anode and a silver chloride cathode. The cathode of this cell is relatively easily fabricated because silver chloride can be extruded through a die while hot to form a self-supporting, integral structure. However, silver chloride is highly expensive, so that a cheaper electrode of similar characteristics would be desirable. Furthermore, in many applications, an electrode capable of producing more power from the same volume or weight of material would be desirable where minimum space or weight is required.

Much work has been done with similar cells employing copper (I) chloride as the cathode material, and such cells have been manufactured for use in buoys or radiosondes. In actual use, however, it has been found that even though copper (I) chloride is considered relatively insoluble, this compound is affected by moisture. It is now believed that hydrated chlorides are first formed, which then absorb water. In any event, the copper compound, when exposed to water, tends to migrate from the cathode to the anode, so that the copper compound comes in contact with the magnesium and plates out thereon. This internal short circuiting effect has caused many of such batteries to heat up and because hydrogen is generated, to catch on fire, sometimes resulting in an explosion. Thus, other cathode materials, not subject to attack by water, are highly desirable.

SUMMARY OF THE INVENTION

I have now found that lead (II) fluoride may effectively be utilized in the cathode of an electrochemical cell. Lead (II) fluoride or plumbous fluoride, hereinafter "lead fluoride," has the advantage of being far less expensive than silver chloride and yet being capable of providing a somewhat greater amount of electric current on a weight to weight basis. Furthermore, because of its particularly high density, lead fluoride provides more current on a volume to volume basis than other inorganic depolarizers now used or contemplated.

Lead fluoride, however, is not an obvious choice as a depolarizer material in such an electrochemical cell. It is a highly reactive compound, e.g., in the molten state it dissolves porcelain and almost all metals and is thus difficult to work with. In addition, it is known that many fluoride compounds, such as nickel (I) fluoride or copper (I) fluoride, decompose when heated in contact with air and thus are difficult to fabricate into electrodes without the use of expensive vacuum or nitrogen-atmosphere equipment. The same might be predicted of lead fluoride, though I have now found otherwise. Furthermore, lead fluoride would appear to be a particularly undesirable electrode substance because it tends to crumble or fracture readily. Thus, even if lead fluoride were fabricated into the shape of an electrode, it would be thought that this material would not be able to maintain the structural integrity required in an electrochemical cell.

I have found, however, that lead fluoride can be fabricated into an electrode and effectively employed in an electrochemical cell. Lead fluoride does not decompose upon heating and can be fabricated, by various methods, into the active component of an electrode possessing sufficient structural integrity.

According to one method, lead fluoride may be subjected to mild heating and intense pressure to force the particles into an integral mass. Optionally, organic binders or a reinforcement such as fiberglass may be incorporated in the lead fluoride depolarizing element to help maintain its structural integrity. Suitable additives, or doping materials, may be added to improve performance for special applications. The depolarizer element may thereafter be sintered, and then an electrically conductive, permeable collector may be formed on the surface of the depolarizing element, as by vapor deposition of a porous metal film or by reduction of the surface to elemental lead.

Alternatively, I have found that a suitable depolarizer material may be incorporated in an electrode by absorption of the molten depolarizer material into a porous carbon reinforcing collector element. The depolarizer material is heated to melting, and then the reinforcing collector, such as a mat of graphite fiber, is immersed therein, absorbing the material into the interstices thereof.

BRIEF DESCRIPTION OF THE DRAWINGS

FIG. 1 is a vertical sectional view of a battery comprising two cells embodying the present invention;

FIG. 2 is a sectional view taken along the line 2—2 of FIG. 1;

FIG. 3 is a fragmentary enlarged longitudinal sectional view of a preferred form of cathode of the present invention;

FIG. 4 is a view similar to FIG. 3 of an alternative form of cathode in accordance with another embodiment of my invention;

FIG. 5 is a view similar to FIG. 3 of still another form of cathode embodying my invention;

FIG. 6 is a vertical cross-sectional view of a battery comprising four cells in accordance with the present invention;

FIG. 7 schematically illustrates one of my preferred processes for making an electrode;

FIG. 8 is an enlargement of a portion of an electrode made by the process of FIG. 7; and FIG. 9 shows an electrochemical cell incorporating the electrode illustrated in FIG. 8.

DESCRIPTION OF THE PREFERRED EMBODIMENTS

Lead (II) fluoride can be fabricated into a hard, controlled density, structurally strong cathode depolarizing element. One method for effecting such fabrication comprises placing finely powdered lead fluoride in a punch and die assembly and subjecting it to pressure, and optionally heating. The actual design of the punch die assembly will determine the range of temperatures and pressures required to yield a suitable electrode depolarizing element. For example, rectangular cathodes (3×1×0.1 in) having a density greater than 97% of that of lead fluoride crystal (which may be designated as "theoretical density" for the depolarizing element) have been fabricated by applying a pressure of 33,000 psi to a die containing this material and heating it to 475° C. Alternatively, at room temperature and a pressure of 43,000 psi, a depolarizing element may be produced, having about 91% of theoretical density.

For special applications, e.g., to increase the operating voltage, certain additives or "dope" may be incorporated in the lead fluoride depolarizing element of the present invention to improve the performance thereof, in amounts desirable below about 25% and most preferably below about 10% by weight of the lead fluoride. Thus, low temperature voltage stability may be improved by adding such compounds as mercury (I) and chloride, and higher current densities may be attained, for example, by doping with copper (II) chloride. Other suitable additives include inorganic halides such as halides of silver, nickel, copper, mercury and lead; organic halides such as trichloromelamine, hexachlorophenol, and carbon tetrabromide; and ammonium and the alkali metal persulfates. The selection of a particular substance as a dope must of course be based upon consideration of the composition of the cathode, the solubility of the dope in the electrolyte, and the reactivity of the dope with the cathode, as well as its effect on the performance of an isolated lead fluoride anode.

A binder, desirably added in amounts up to about 5% by weight of the lead fluoride, may be incorporated in the depolarizing element by mixing it into the powder before pressing. Suitable binders include stearic acid, sodium alginate, diglycol stearate, polyvinyl acetate, polyvinyl alcohol, polyvinyl pyrrolidone, polyethylene powder, gums, resins and other polymeric materials. With the incorporation of such binders, depolarizing elements having densities in excess of 94% of the density of lead fluoride may be produced at room temperature.

In addition, fibrous materials such as fiberglass, graphite, nylon, or metal filaments or mat have been found to enhance the structural integrity of pressed powder electrodes. If metal filaments are used, they must not react with the lead fluoride. Lead is preferable and copper is a suitable alternative. The amount of fibrous material added may vary depending upon the application. In general, the more fibrous material incorporated in the electrode, the lower is the final electrode density and the greater is the volume. In general, it is not advantageous for an electrode to contain more than about 25% by weight of fibrous material, and desirably, as little as 2% by weight may be employed to produce the desired strengthening effect.

After the pressed powder depolarizing element has been fabricated, it may desirably be sintered. It is especially desirable to sinter an element which was pressed at room temperature and which contains no organic binder because the sintering process relieves some of the internal stress produced during low temperature fabrication. Sintering conditions may of course vary. Temperatures of about 500° C for 45 minutes have been found particularly suitable.

The cathode is completed by adding a collector to the lead fluoride depolarizing element. The term "collector" refers to that part of an electrode which is electrically conductive and serves to collect and transfer electrons from one electrode to the other through the resistive external circuit. The collector of a lead fluoride cathode is an electrically conductive and ionically permeable layer which must be bound in intimate contact with the surface of the underlying lead fluoride depolarizing element.

Various conventional methods are suitable for applying the thin, porous collector surface, including vapor deposition, flame spray metal deposition, application of an electrically conductive thin layer of paint, or by reducing the outer surface of the lead fluoride depolarizing element to elemental lead. Suitable materials for the collector also include copper, silver, and nickel. In general, any of the less electropositive metals that would not appreciably react with the lead fluoride could be used for the collector.

The wire conductor or battery terminal is secured in contact with the collector. The following method for incorporating a very secure anchoring point for the cathode terminal in the pressed powder electrode has been found very successful. One or more small metal pellets, e.g., 3-mm spheres, are placed in the die containing the lead fluoride powder. Upon pressing, the pellet forms an integral part of the depolarizing element. The wire conductor can then be rigidly secured, such as by soldering, to the pellet as an anchoring point. When the collector is then applied to the cathode, it also makes electrical contact with the pellet and thus with the wire conductor. This method eliminates the necessity for attempting to anchor a wire to the thin and delicate collector surface. The pellet may be made of any metal which is sufficiently soft and is unreactive with the lead fluoride. Pellets of copper or of lead have been found particularly useful in this application. Pressing and sintering temperatures should be below the melting point of the pellets.

In addition to the aforesaid method, I have discovered an alternative method for fabricating an electrode containing a depolarizing material, which method produces electrodes having extremely high strength. According to this method, the depolarizing material is heated to a molten state in a suitable vessel, e.g., of high density, nonporous graphite. For example, lead fluoride melts somewhat below 875° C and may be used at about this temperature or any higher temperature below that at which it vaporizes. A preheated "biscuit" of graphite having very high porosity, which is preferably of the size and shape desired for the final electrode, is then placed into the molten depolarizing material and allowed to float on the surface thereof. The molten material is absorbed into the numerous voids of the highly porous graphite biscuit. After several minutes in contact with the molten material, the biscuit is withdrawn from the melt and allowed to cool.

The graphite biscuit having depolarizer absorbed therein is electrically conductive. However, the surface may be coated with a nonconductive coating of depolarizer material. This layer may be removed, as by grinding to expose the graphite, or a collector may then be applied, as by electroplating the graphite with any suitable collector metal desired. A conducting wire may then be soldered to the metal surface of the collector.

If extremely thin electrodes are required, as for special high voltage multicell batteries or rapid discharge cell application, such electrodes are preferably made from a biscuit of graphite or carbon fabric, or mat, such as "Avceram" (FMC Corp.).

Various examples of batteries in accordance with the present invention are shown in the accompanying drawings to illustrate specific embodiments which have been found particularly satisfactory. Other battery construction will, of course, be readily apparent to one skilled in making electrochemical cells.

Referring now to FIG. 1, one such battery 10 comprises a pair of cells 12a and 12b. The cells 12a and 12b are identical, so that a description of cell 12a will apply equally to cell 12b. The cell 12a comprises a cathode 14a having a lead fluoride depolarizing element 16a with a metal collector 18a on the surface thereof.

The surface of a metal pellet 20a is exposed at one end of the electrode 14a as a terminal or anchoring point for the wire conductor 21a.

A separator 22a of cellulose sponge, or other fibrous or membrane-like material surrounds the cathode 14a within the cylindrical anode 23a. The anode is preferably an electropositive metal such as magnesium, zinc, manganese, aluminum, tin, or an alloy thereof, including in particular magnesium alloys, such as AZ 31. Alternatively, when used with a nonaqueous electrolyte solution as described hereinbelow, the anode may be made of any of the aforesaid metals or a more highly reactive metal such as sodium, potassium, lithium, calcium, or barium, or alloys thereof.

An insulating outer covering 24a surrounds the outside surface of the anode 23a. The outer covering 24a may be, e.g. of plastic or a nonconductive painted or anodized coating.

Both ends of the cylindrical cell 12a are covered with an end cap or plug 26a, 28a, desirably of plastic or rubber. The lower end cap 26a has an orifice 30a through which the electrolyte solution is introduced into the cell. The upper end cap 28a also has an orifice 32a through which any hydrogen liberated at the anode may be expelled. To minimize intercell leakage of current, it is advantageous to make the top and bottom orifices 30a, 32a as small in diameter as possible without overly diminishing the flow of fluids therethrough.

The electrolyte solution introduced through the bottom orifice 30a may desirably be a water solution containing dissolved salts, for example sea water. The nature and concentration of the ionized salts in the solution may vary greatly, so long as the solution is relatively conductive and does not contain dissolved ions which react substantially at either of the electrodes.

Alternatively a polar organic solvent may be utilized, such as for example dimethyl sulfoxide, tetrahydrofuran, propylene carbonate, ethylpyridinium bromide, succinonitrile, butyrolactone, and dimethylformamide. Any ionizable compound of suitable solubility and low reactively may be employed, including for example the halides and perchlorates of lithium and magnesium.

In general, if a nonaqueous solvent is employed, hydrogen is not generated at the anode and a metal hydroxide is not produced. Thus, the self-heating effect which makes such cells particularly useful at low temperatures is eliminated. However, a side reaction, producing metal hydroxide, is also eliminated by using a nonaqueous electrolyte solution, making the overall utilization of the anode material more efficient, e.g. about twice as efficient for a magnesium anode. Furthermore, use of a non-acidic nonaqueous solvent permits the more electropositive metals to be employed as anodes, e.g. sodium, as noted hereinabove, so that the emf of the resulting cell may be substantially greater than that of a cell with an anode of magnesium or other relatively less active metal.

A wire conductor 34a extends through the insulation 24a to the anode 23a, to which it is secured in electrical contact as by soldering. Alternatively, the conductor 34a could extend through one of the end caps 26a or 28a, or less preferably, through one of the orifices 30a or 32a through which the cathode conductor 21a does not extend. This latter alternative could, however, cause internal short circuiting and should be avoided where possible.

The battery 10 illustrated in FIG. 1 comprises two cells 12a and 12b connected in series, so that the conductor 21a is in electrical contact with the conductor 34b, and is desirably integral therewith. The battery 10 has a positive conductor 21b and a negative conductor 34a extending therefrom.

FIGS. 3, 4 and 5 illustrate alternative embodiments of the compressed lead fluoride cathode. The depolarizing element is shown as compressed lead fluoride (FIG. 3), fiberglass reinforced compressed lead fluoride (FIG. 4), and lead fluoride mixed with an organic binder (FIG. 5).

FIG. 6 illustrates a four-cell battery 110 wherein the anodes 112a, 112b, 112c, 112d and cathodes 114a, 114b, 114c, 114d are in the form of plates and wherein the cathode and anode of adjacent cells about one another in electrical contact. That is cathode 114a abuts anode 112b, cathode 114b abuts anode 112c, and cathode 114c abuts anode 112d. Cathode 114d and anode 112a are connected to conductor wires 116 and 118, respectively. A plateshaped porous separator 120a, 120b, 120c, 120d similar to the separator 22a described hereinabove with respect to FIGS. 1 and 2, is interposed between the cathode 114a, 114b, 114c, 114d and anode 112a, 112b, 112c, 112d of each cell. Inlet and outlet orifices 122a, 122b, 122c, 122d and 124a, 124b, 124c, 124d are provided in a single casing 126 which encloses the battery 110.

The following description of the fabrication and operation of one of the preferred embodiments is provided to illustrate more fully the present invention without limiting the scope thereof. In such preferred embodiment, finely powdered lead fluoride (58.2g) having the consistency of flour is placed in a 5 × 1-in die cavity heated to about 150° C. A 3-mm lead pellet is placed at one end thereof, and the assembly is then subjected to a force of 100 tons by a hydraulic press. A one-piece depolarizing element in the shape of a 5 × 1 × 0.086-in plate is thereby produced.

A copper wire is then soldered to the exposed surface of the pellet, and a nickel collector is then applied by flame spray metal deposition onto the surface of the depolarizing element.

A plastic sponge separator is placed around the cathode and this assembly is then inserted into a magnesium cylinder (11.52 g) which serves as the anode. The anode then has a copper wire soldered thereto and a plastic cap having an orifice of about 3 mm diameter placed over each end thereof, the wire from the cathode passing through one of the orifices. The cell is completed by painting the exposed surface of the cylindrical anode and is activated by adding sea water as the electrolyte solution through the lower orifice, replenishing as needed.

Such a cell may, for example, be discharged at the rate of 0.176 amp for a duration of 72 hr, the total cell capacity being 12.7 amp-hr.

Periodic examination of one such cathode showed that the depolarizing element became increasingly porous as the cell was discharged, the 58.2 g of lead fluoride being reduced to 49.18 g of elemental lead and the remainder being freed as fluoride ion. Inasmuch as the density of lead fluoride is 8.24 g/cm$^3$, the original lead fluoride occupies 7.06 cm$^3$, whereas the density of lead is 11.3 g/cm$^3$ so that the lead produced therefrom occupies 4.35 cm$^3$. As the volume of solid material comprising the depolarizing element decreases from the former to the latter value, the depolarizing element becomes more and more porous, permitting the electrolyte to permeate through the already reduced lead to the lead fluoride remaining in the interior thereof. Of course, if the electrolyte could not permeate the outer layer of lead produced, cell operation would quickly cease. Thus, the fact that lead fluoride does produce a porous outer jacket of lead as the cell is discharged is a significant characteristic making this compound suitable as a depolarizer material.

pylene 0.12 in thick. The electrolyte was sea water at 20° C.

Cell "B" had a depolarizing element of powdered lead fluoride formed at 48,000 psi in the presence of 1.5% of acetone to enhance flow and porosity. It was not sintered. The exposed surface area of the cathode was 1.66 in$^2$. The cathode was separated from the magnesium anode by a pair of plastic strips 0.1 in thick and 0.15 in wide placed along the edges thereof. Sea water at 20° C was employed.

Cell "C" had a "doped" depolarizing element formed of lead fluoride powder and 10% mercury (I) chloride at 32,000 psi and not sintered. The anode, electrolyte solution and separators were the same as in Cell "B".

Table I reports the current flow and the voltage drop across various resistances in series with each cell as determined with a vacuum-tube meter. Average power density, current density and internal resistance calculated therefrom are also reported.

Table 1

| Cell | A | | B | | C | |
|---|---|---|---|---|---|---|
| Resistance | emf | current | emf | current | emf | current |
| 20.0 ohm | 0.90 v | 45.0 ma | 0.88 v | 44 ma | 0.92 v | 46. ma |
| 9.6 | 0.81 | 84.4 | 0.75 | 78 | 0.78 | 81.2 |
| 8.5 | 0.80 | 94.1 | 0.72 | 85 | 0.77 | 90.6 |
| 7.7 | 0.79 | 102.7 | 0.70 | 91 | 0.72 | 93.6 |
| 7.0 | 0.78 | 111.4 | 0.68 | 97 | 0.7 | 100. |
| 5.51 | — | — | — | — | 0.635 | 115.2 |
| 5.12 | — | — | — | — | 0.61 | 119.1 |
| Avg. Power Density | 30 milliwatt/in$^2$ | | 36 milliwatt/in$^2$ | | 45 milliwatt/in$^2$ | |
| Avg. Current Density | 37.4 ma/in$^2$ | | 47.6 ma/in$^2$ | | 62 ma/in$^2$ | |
| Avg. Internal Resistance | 0.107 ohm | | 0.106 ohm | | 0.127 ohm | |

The following description is provided to illustrate more fully the fabrication of another preferred embodiment of the present invention. Referring to FIGS. 7, 8 and 9, a biscuit 210 of porous graphite, such as for example a fibrous mat of Avceram graphite fabric, is placed in contact with molten depolarizing material 212, for example lead fluoride at 875° C, heated in a nonporous graphite crucible 214. As shown in FIG. 8, the depolarizer is absorbed into the voids thereof, and upon removal from the bath, it solidifies to form granules 216 filling the pores of the graphite 210. Excess depolarizer on the surface of the biscuit 210 is ground off, and the collector 218 is placed thereover as by electrodeposition, thereby forming electrode 220. A conducting wire 222 is then soldered to one end thereof. The electrode 220 may be incorporated in a cell 224 in the same manner as the other cathodes described hereinabove.

The following examples report more fully the electrical characteristics of various cells embodying the present invention.

EXAMPLES

Numerous prototype cells were constructed according to various preferred embodiments of the present invention to determine their operational characteristics.

Cell "A" had a depolarizing element of powdered lead fluoride formed at 33,000 psi and then sintered. The exposed surface area of the cathode and of the magnesium anode was 2.345 in$^2$, the electrodes being separated by a fluted membrane of perforated polypro- It is to be noted that many of the preferred cells embodying the present invention are especially suited to long term storage out of contact with electrolyte and then to activation by the addition of sea water as a particularly useful electrolyte therewith.

While I have herein shown and described the preferred forms of the present invention and have suggested modifications therein, other changes and modifications may be made therein without departing from the spirit and scope of this invention.

Having thus described my invention, what I desire to secure by Letters Patent and hereby claim is:

1. In an electrochemical cell activatable by the addition thereto of a conductive electrolyte, said cell including an anode comprising a metal more electropositive than lead fluoride, the improvement comprising a self-supporting cathode comprising lead fluoride and not more than twenty five percent by weight of lead fluoride of dope.

2. The cell of claim 1 wherein the metal is magnesium.

3. The cell of claim 1 further comprising an aqueous electrolyte solution, wherein the anode metal is selected from the group consisting of magnesium, zinc, manganese, aluminum, tin and combinations thereof.

4. The cell of claim 3 wherein the aqueous electrolyte solution is sea water.

5. The cell of claim 4 wherein the anode metal is magnesium.

6. The cell of claim 1 wherein said cathode comprises pressed, powdered lead fluoride and a layer of collector material on a portion of the surface thereof.

7. The cell of claim 6 wherein said cathode further comprises a metal pellet at one end thereof as a terminal therefor.

8. The cell of claim 6 wherein said collector is porous graphite and said lead fluoride is dispersed through the interstices thereof.

9. The cell of claim 8 wherein said porous graphite collector is a mat of graphite fibers.

10. The cell of claim 1 further comprising an electrolyte solution comprising a polar organic liquid, wherein the anode metal is selected from the group consisting of sodium, potassium, lithium, calcium, barium, magnesium, zinc, manganese, aluminum, tin and combination thereof.

11. The cell of claim 1 wherein the weight of said dope is not more than ten percent of the weight of said lead fluoride.

* * * * *